(12) United States Patent
Johnson

(10) Patent No.: US 7,077,582 B2
(45) Date of Patent: *Jul. 18, 2006

(54) QUICK-RELEASE CLAMP FOR PHOTOGRAPHIC EQUIPMENT

(76) Inventor: Joseph M. Johnson, P.O. Box 6531, Los Osos, CA (US) 93412

( * ) Notice: Subject to any disclaimer, the term of this patent is extended or adjusted under 35 U.S.C. 154(b) by 0 days.

This patent is subject to a terminal disclaimer.

(21) Appl. No.: 10/746,775

(22) Filed: Dec. 23, 2003

(65) Prior Publication Data

US 2005/0041966 A1 Feb. 24, 2005

Related U.S. Application Data

(63) Continuation-in-part of application No. 10/645,419, filed on Aug. 20, 2003, now Pat. No. 6,773,172.

(51) Int. Cl.
*G03B 17/00* (2006.01)

(52) U.S. Cl. ...................................................... 396/428

(58) Field of Classification Search ................. 396/329, 396/428, 319, 422; 248/178.1
See application file for complete search history.

(56) References Cited

U.S. PATENT DOCUMENTS

| 2,791,950 A | * | 5/1957 | Oppenheimer | 396/329 |
|---|---|---|---|---|
| 2,824,504 A | | 2/1958 | Bethmann | |
| 2,840,334 A | | 6/1958 | Cauthen | |
| 3,356,325 A | | 12/1967 | Schnase | |
| 3,677,509 A | | 7/1972 | O'Connor | |
| 4,768,049 A | * | 8/1988 | Barrett et al. | 396/329 |
| 4,929,973 A | | 5/1990 | Nakatani | |
| 5,601,265 A | | 2/1997 | Lopez | |
| 5,870,641 A | | 2/1999 | Chrosziel | |
| 6,196,504 B1 | | 3/2001 | Lemke | |
| 6,435,738 B1 | | 8/2002 | Vogt | |
| 6,701,081 B1 | * | 3/2004 | Dwyer et al. | 396/329 |
| 6,773,172 B1 | * | 8/2004 | Johnson et al. | 396/428 |

FOREIGN PATENT DOCUMENTS

JP  97395  4/2000

OTHER PUBLICATIONS

Web page; "bogen 303 QTVR Panoramic Head Kit—Supports 11 lb (5 kg);" *B&H Photo Video Pro Audio Product Page;* 1 page; at bhphotovideo.com Jan. 2, 2005.
Web page; "KAISER Universal Graduated Stage with Crossed Stages;" *B&H Photo Video Pro Audio Product Page;* 1 page; at bhphotovideo.com Jan. 2, 2005.
Web page; "bogen QTVR Spherical Upgrade Kit—to Convert 3415 to Spherical 303SPH (Multi-Row) Head;" *B&H Photo Video Pro Audio Product Page;* 1 page at bhphotovideo.com Jan. 2, 2005.

* cited by examiner

*Primary Examiner*—Christopher Mahoney
(74) *Attorney, Agent, or Firm*—Chernoff, Vilhauer, McClung & Stenzel

(57) ABSTRACT

A clamp for securely mounting photographic equipment to a support, such as a tripod.

20 Claims, 11 Drawing Sheets

QUICK-RELEASE CLAMP FOR PHOTOGRAPHIC EQUIPMENT

CROSS REFERENCE TO RELATED APPLICATIONS

This application is a continuation-in-part of U.S. patent application Ser. No. 10/645,419, filed Aug. 20, 2003 now U.S. Pat. No. 6,733,172.

BACKGROUND OF THE INVENTION

The present invention relates to a clamp for mounting photographic equipment to a support, such as a tripod or ball head.

Photographic equipment may be mounted to a camera stand in a variety of ways. Some camera bodies, for example, have threaded sockets in their base so they can be directly mounted to a bolt that extends upwardly from the support. The camera body is positioned over the support so that the bolt fits within the socket and the camera body is spun around several times to screw the camera body to the support. Alternatively, and particularly when a heavy, elongate camera lens is attached to a camera body, the camera lens will include a support having a threaded socket positioned below the lens so that the lens may be mounted to the support in the same manner as a camera body.

These methods take an appreciable amount of time and require care to ensure that the threads of the stud are properly aligned with the threads in the socket. Further, there is often insufficient time to screw the camera body or lens to the tripod before a particular shot should be taken. This lack of time requires that the camera either be held in-hand, potentially resulting in image blur from the shake of the hand, or that the shot be missed altogether.

These difficulties can be reduced by using a quick-release clamp to mount photographic equipment to a support. Such quick-release clamps are typically designed to screw onto the bolt of the support while the photographic equipment is releasably secured to the upper surface of the clamp so that it can quickly be secured to, or released from, the support. To secure photographic equipment to such a quick-release clamp, the photographic equipment such as a camera body will typically include two parallel, opposed rails extending from its base. The opposed rails may be provided by the equipment or in the form of a plate secured to the equipment. The rails are spaced apart so that they fit within an upwardly facing channel defined by the clamp. The clamp includes a lever that moves between two positions to adjust the spacing between the side walls of the channel so that, when in a first, locking position, the channel grips the rails connected to the camera system and when in a second, released position, the channel disengages the rails so that the photographic equipment may be lifted from the clamp. In this manner, the lever may be used to quickly secure or release the photographic equipment from the support.

Unfortunately, existing quick-release clamps have certain disadvantages. In order to provide for relative movement of the side walls of the channel, one or more springs apply an outward force to the side walls, so that they move apart as the lever is moved to the second position. This outward force tends to likewise push the lever away from the first, locking position, thus loosening the fitting between the photographic equipment and the clamp. Further, as a result of usage over time, the lever and the clamp tend to loosen from one another, thereby widening the spacing of the channel walls in the locked position and thus loosening the fitting between the photographic equipment and the clamp when in the locked position.

Further, the lever in existing quick-release clamps is positioned solely on an outer lateral side of the clamp, underneath one side of the camera body. This position makes it awkward to reach underneath the camera to operate the lever. This problem is exacerbated with quick release clamps that use an adjustment screw to adjust the spacing between the side walls of the channel rather than a lever, as it is difficult to rotate the screw while the camera is mounted over it.

It is therefore desired to provide a clamp for easily, quickly, and securely mounting photographic equipment to a support.

DETAILED DESCRIPTION OF THE PREFERRED EMBODIMENT

Figure 1:
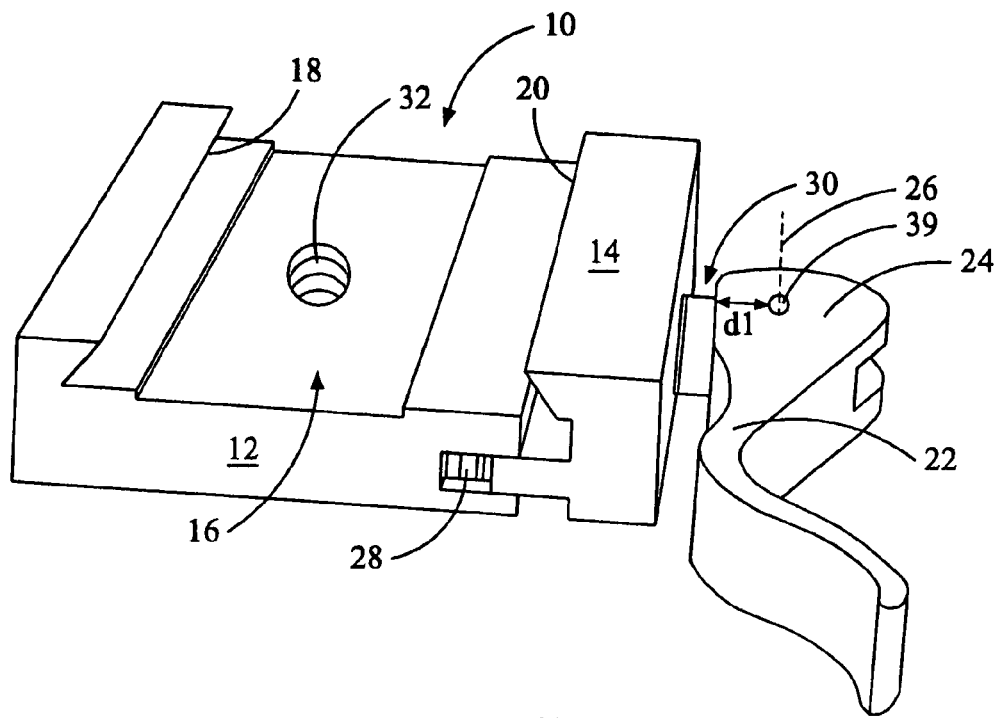
FIG. 1 is a perspective view of a clamp that incorporates aspects of the present invention where the clamp has a lever in a disengaged position where photographic equipment may be inserted into, or removed from, the clamp.
Figure 11:
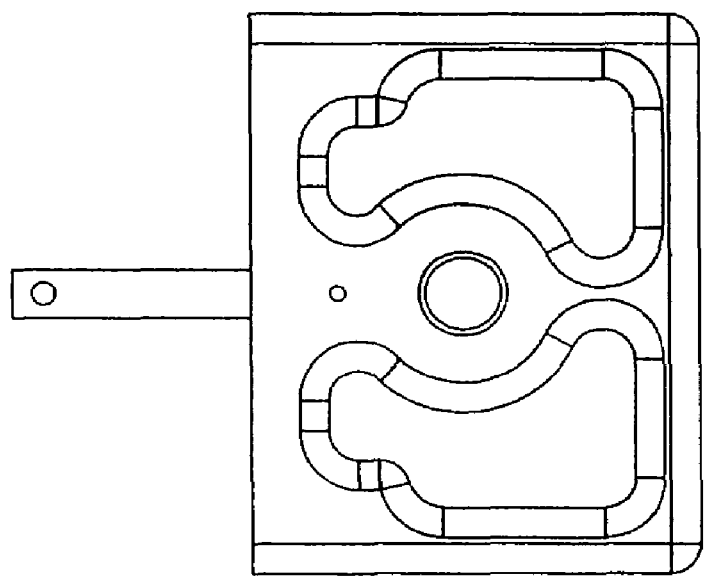
FIG. 11 is a bottom view of the stud shown in FIG. 6 inserted into the body shown in FIG. 6.
Figure 12C:
FIGS. 12A–12C are views of a thrust washer shown in FIG. 6.
Figure 12B:
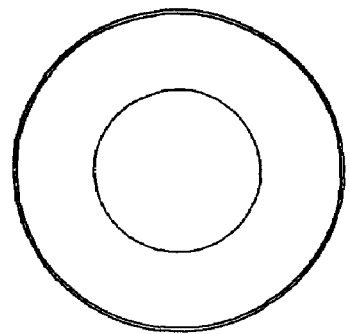
Figure 12A:
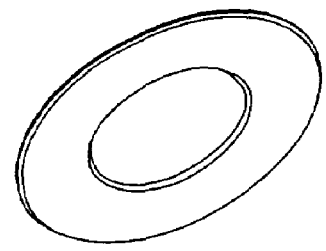

FIG. 1 shows a clamp 10 that comprises a body 12 and an adjustable arm 14 (shown in FIGS. 10A–10E) that together form a channel 16 having opposed side walls 18 and 20. The body 12 may define an opening 32 through which the clamp 10 may be secured to the upper portion of a tripod or other support. The adjustable arm 14 is slidably engaged along the cantilevered portion 59 of a stud 36 (shown in FIGS. 6, 7, and 9A–9C) securely mounted in the body 12, as shown in FIG. 11. Movement of the adjustable arm 14 selectively adjusts the width of the channel 16 and is accomplished through manual operation of a lever 22 fastened to the distal end 60 of the stud 36. The lever 22, attached to the adjustable arm 14, permits quick adjustment of the spacing between the side walls 18 and 20 so that the channel 16 may selectively either grip or release a pair of rails attached to the base of a camera body (not shown). Each respective side wall 18 and 20 is preferably angled upward and inward to facilitate engagement with such rails. In this manner, photographic equipment may be quickly engaged or released from a tripod or other support.

Figure 4:
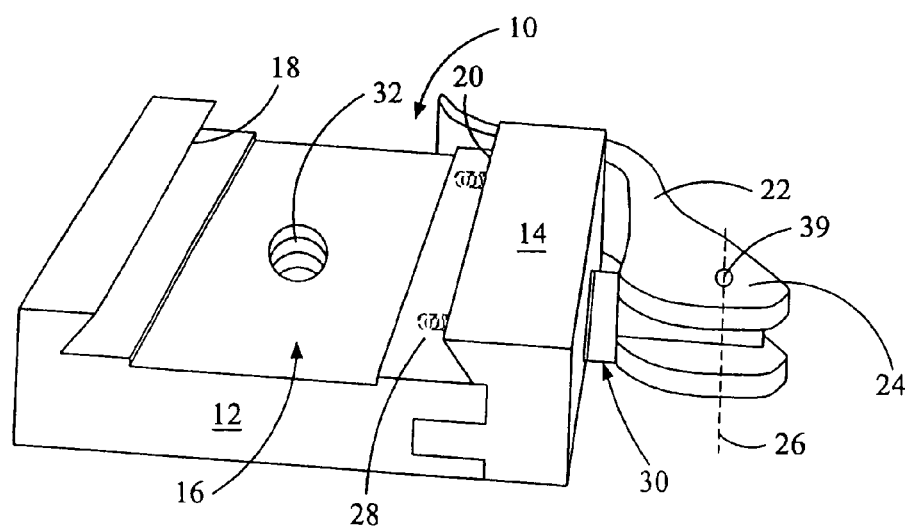
FIG. 4 is a perspective view of the clamp of FIG. 1 showing the lever in an engaged position where the photographic equipment may be secured to the clamp.

The lever 22 may be a cam lever that includes a cam portion 24 that rotates about a pivot axis 26 as the cam lever is moved between a first, unlocked position (shown in FIG. 1) and a second, locked position (shown in FIG. 4). The cam portion 24 has an asymmetrical shape about the pivot axis 26 so that the lever 22 pushes the adjustable arm 14 inward as the lever 22 is moved from a first position for releasing photographic equipment from the clamp 10 to a second position for gripping photographic equipment to the clamp 10. Conversely, as the lever 22 is moved from the second position to the first position, a pair of counterforce springs 28, housed within the body 12, push outward on the adjustable arm 14 so that the channel 16 expands.

Figure 6:
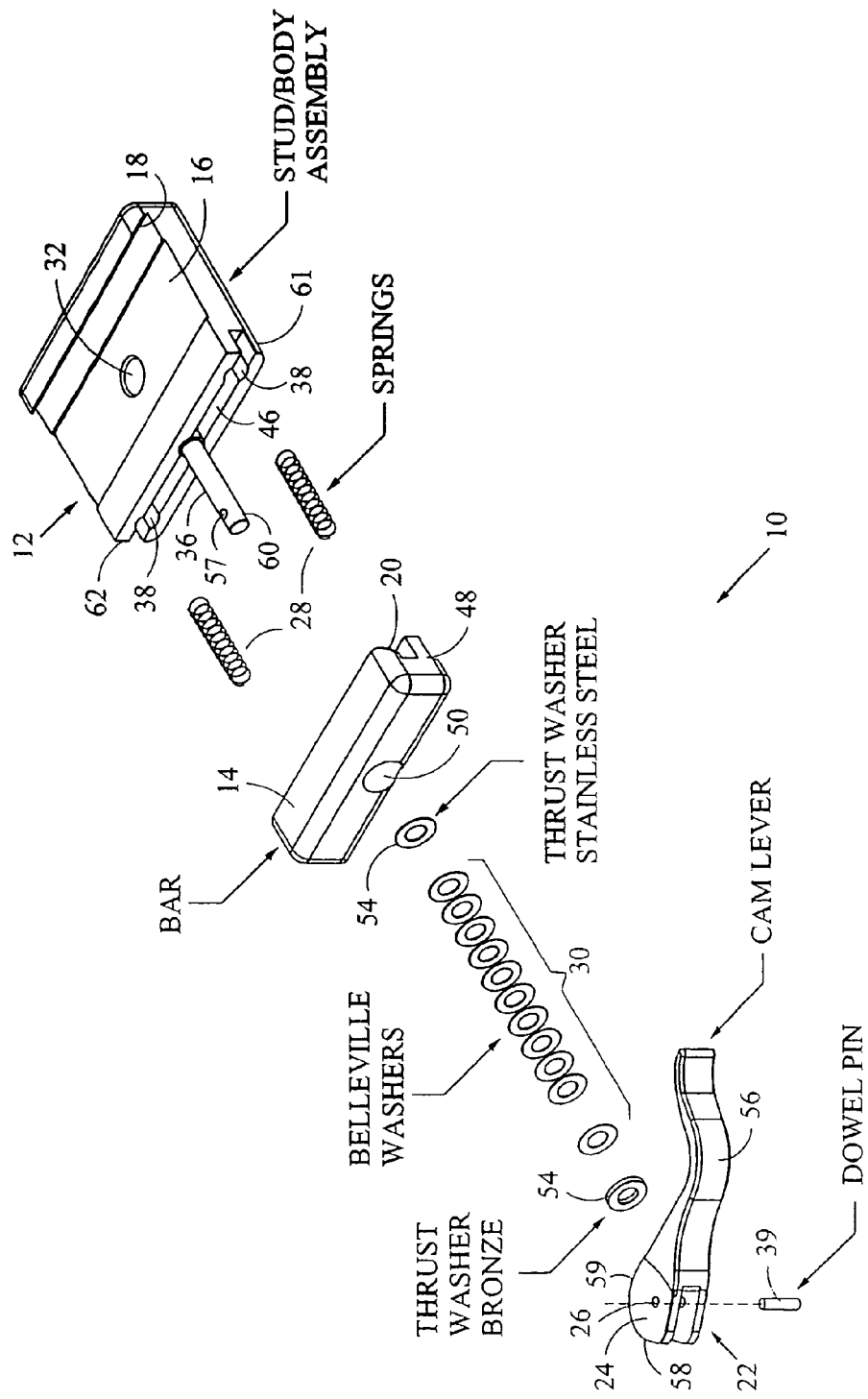
FIG. 6 is an assembly drawing of the clamp shown in FIG. 1

The outwardly directed force applied by the springs 28 on the adjustable arm 14 is at a maximum when the lever 22 is in the second position, i.e. when the channel 16 is intended to grip photographic equipment. The force applied by the springs 28 therefore acts to undesirably loosen the grip on the photographic equipment. The disclosed clamp 10, however, includes a locking member 30 that prevents any outward movement of the adjustable arm 14 that might otherwise result from the force applied by the springs 28. The locking member 30 may be substantially compressible, such as a compression spring, and interposed between the lever 22 and the adjustable arm 14. FIG. 6, for example, shows a series of Belleville washers 30 that together operate as a compression spring. Alternatively, the locking member 30 could be a helical compression spring or any other appropriate force generating member. Further, the locking member 30 may be interposed between the adjustable arm 14 and the body 12. The locking member 30 may preferably apply an inwardly-directed force on the adjustable arm 14 that increases as the lever 22 is moved from the first position towards the second position. The inward force applied on the adjustable arm 14 by the locking member 30 may preferably be greater than the outward force applied by the springs 28 when the lever 22 is in the second position. Also, the lever 22 may preferably include an over-center detent position.

The manner in which clamp 10 may be operated to achieve the foregoing advantages is seen in reference to FIGS. 1–4. FIG. 1 shows the clamp 10 where the lever 22 is in the first position, i.e. the released position. In this first position, the adjustable arm 14 is spaced apart from the body 12 by an applied force from the springs 28, thus widening the channel 16 to allow the insertion or removal of photographic equipment. The cam portion 24 is oriented such that the locking member 30, which in this instance is a series of Belleville washers that act as a compression spring, is sufficiently relaxed so as to not apply a sufficient inward force on the adjustable arm 14 to overcome the outward force of the springs 14. In this position, the cam portion 24 preferably abuts the locking member 30 at a minimum distance d1 from the pivot axis 26. As the lever 22 is moved from the first position toward the second position, the cam portion 24 pushes the locking member 30 and the adjustable arm 14, inward. The locking member 30 begins to compress to counterbalance the outward force of the springs 28 applied to the adjustable arm 14 as it moves inward.

Figure 2:
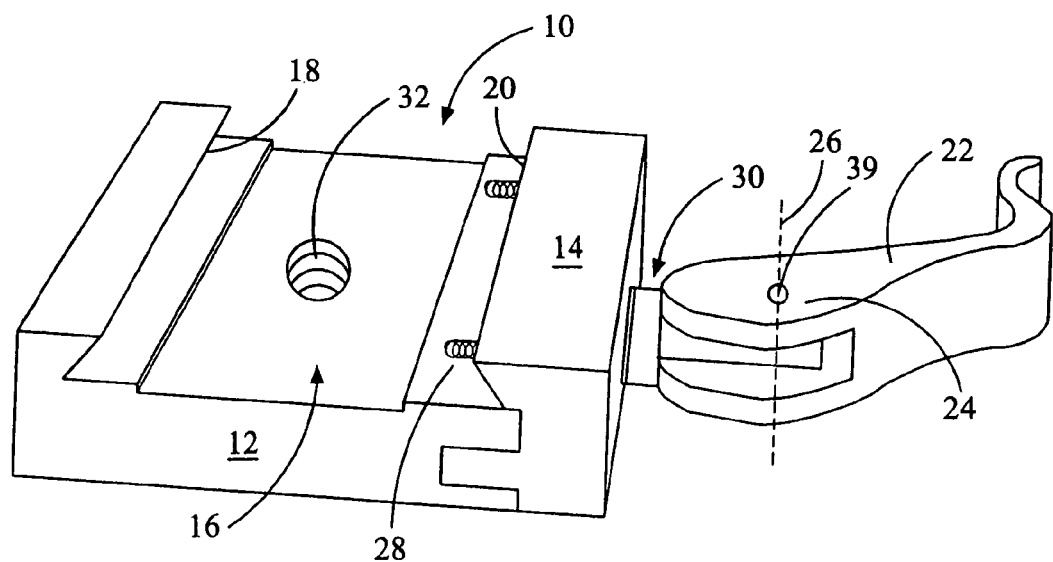
FIG. 2 is a perspective view of the clamp of FIG. 1 showing the lever in a first intermediate position between an engaged and disengaged position, where the channel of the clamp is at its minimum width.

FIG. 2 shows the lever 22 in a first intermediate position where the lever 22 has been moved to a position where the adjustable arm 14 is flush with the body 12. In this position, the forces applied by the locking member 30 and the springs 28 counterbalance each other; further movement of the lever 22 towards the second position, however causes the inward force applied by compression of the locking member to increase over that of the springs 28 because the adjustable arm 14 may not move any further while the locking member 30 will continue to compress.

Figure 3:
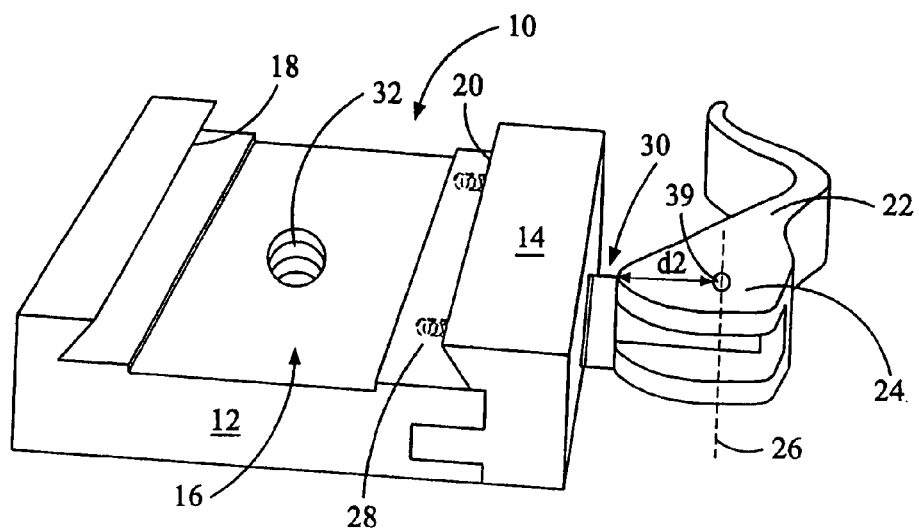
FIG. 3 is a perspective view of the clamp of FIG. 1 showing the lever in a second intermediate position between an engaged and disengaged position, where the channel of the clamp is at its minimum width and pivot axis of the lever is at its maximum distance form the channel.

FIG. 3 shows the lever 22 in a second intermediate position where the locking member 30 is applying a maximum inward force on the adjustable arm 14. This is a position where the cam portion 24 preferably abuts the locking member 30 at a maximum distance d2 from the pivot axis 26. In this position, the inward force applied by the locking member 30 to the adjustable arm 14 is substantially greater than the outward force applied by the springs 28. Further movement of the lever 22 toward either the first or second position will relax the locking member 30 with respect to the maximum inward force as the distance from the pivot axis 26 on which the locking member 30 abuts the cam portion 24 decreases.

FIG. 4 shows the lever 22 in the second position. In this position, the lever 22 is in an over-center detent configuration such that movement of the lever 22 toward the first position will act to compress the locking member 30. Thus the locking member 30 resists movement of the lever 22 toward the first position. Preferably, when in this position, the inward force applied by the locking member 30 to the adjustable arm 14 is still greater than the outward force applied by the springs 28. Alternatively, the two forces could be precisely counterbalanced. In this manner, the adjustable arm 14 is locked into place because the springs 28 do not apply a sufficient force to overcome that force applied by the locking member 30.

The locking member 30 preferably applies a force to the adjustable arm 14 and the lever 22 that varies with the position of the lever 22. The force preferably increases as the lever is moved from the first position towards the second position. The force preferably reaches a maximum before the lever reaches the second position. More preferably, the force applied by the locking member 30 is less than that maximum when in the second position, so that the force applied by the locking member also increases as the lever is moved from the second position towards the first position.

Figure 5:
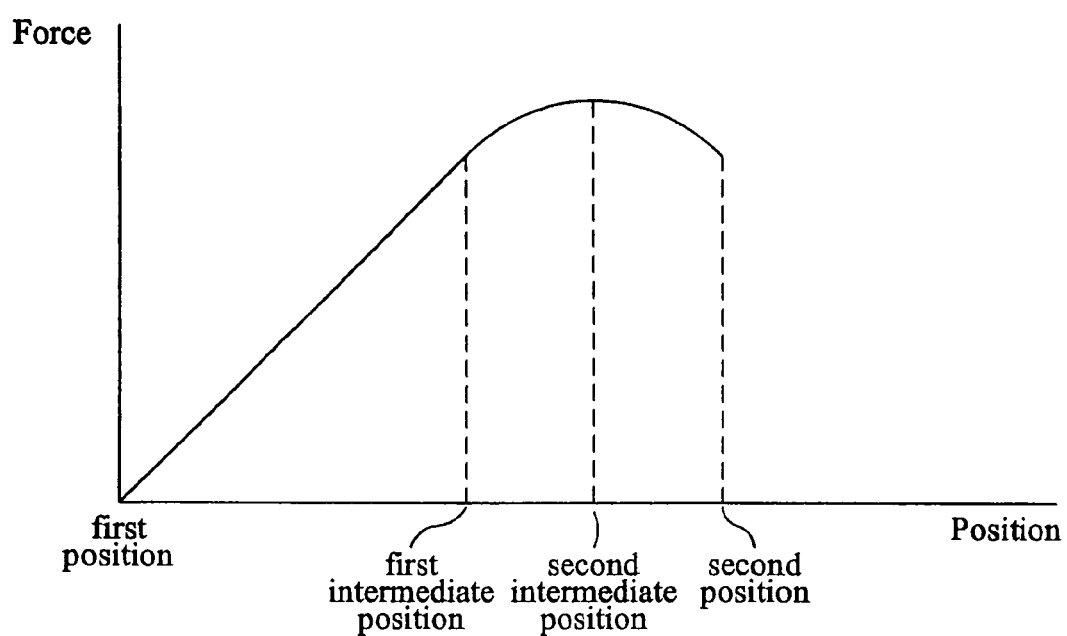
FIG. 5 is a graph of a force profile generated by the clamp of FIG. 1 as the lever is moved over a range of motion from a first position to a second position.

The locking member 30 together with the lever 22 will achieve a force profile generally depicted in FIG. 5. This figure indicates that as the lever 22 is moved over a range of motion extending from the first position to the second position, the force increases to a maximum at a second intermediate position and then decreases as the lever 22 continues to the second position.

It should also be noted from this figure FIG. 5 the adjustable arm 14 may cease its inward motion at a first intermediate position before the locking member has reached its maximum force. This may be preferable so that the inward force applied by the locking member 30 on the adjustable arm 14, when the lever is in the second position, can still overcome the outward force applied by the springs 28 even though the force applied by the locking member 30 has fallen from its maximum. It should be further noted that the movement of the adjustable arm 14 corresponds to the movement of the lever. Therefore, it is desirable that the lever move through a large percentage of it range of motion before the adjustable arm ceases to move, and achieve a maximum force in the remaining range of motion of the lever. For that reason, the force applied by the locking member 30 in the disclosed clamp 10 achieves its maximum value at approximately 80–90% of the lever's range of motion. It should be understood, however, that other embodiments may achieve a maximum force anywhere along the lever's range of motion, but preferably greater than 50%.

The force profile depicted in FIG. 5 is smooth, i.e. as the lever is moved from the first position, the force increases continuously to a maximum and decreases continuously until the lever reaches the second position. Alternative embodiments may design a lever that permits the force profile to decrease at certain intervals on the lever's path from the first position to the second intermediate position of maximum force, or to increase on the lever's path from that second intermediate position to a lesser force at the second position, or both. Preferably, however, the force profile is increasing over at least 65% of the lever's path from the first position to the second intermediate position and is decreasing over at least 65% of the path from the second intermediate position to the second position.

Though the force profile depicted in FIG. 5 is achieved by using a lever 22 in conjunction with the locking member 30, it should be understood that levers of other shapes may be used to achieve the same or similar force profiles. Further, other structures may be substituted for the lever, such as a plunger or a button.

Figure 7:
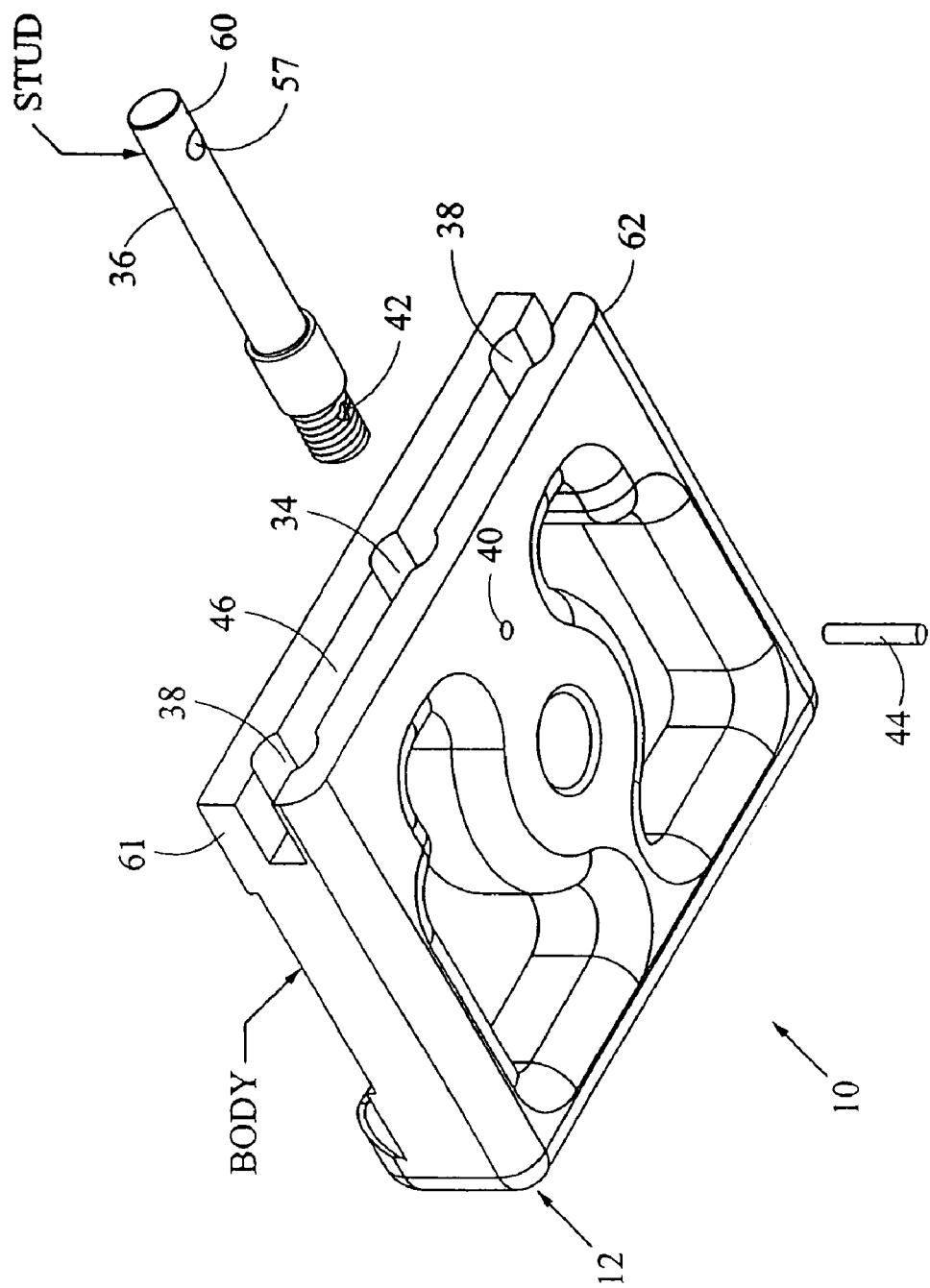
FIG. 7 is an assembly drawing of a portion of the clamp shown in FIG. 1 showing the manner in which the stud is secured to the clamp.
Figure 8A:
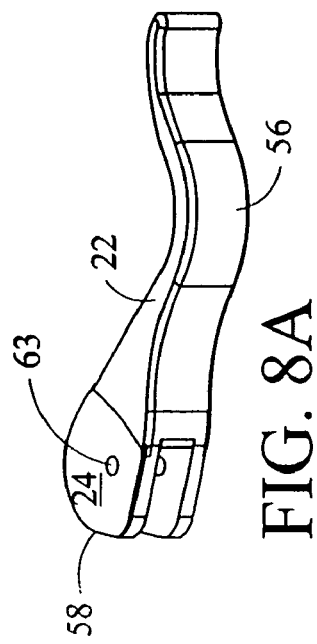
FIGS. 8A–8E are views of the cam lever of the clamp of FIG. 1.
Figure 8E:
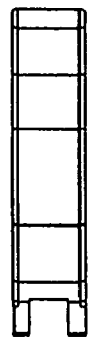
Figure 8B:
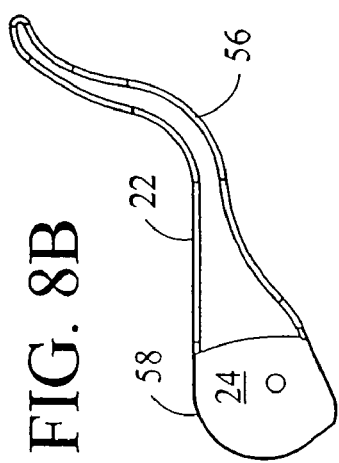
Figure 8C:
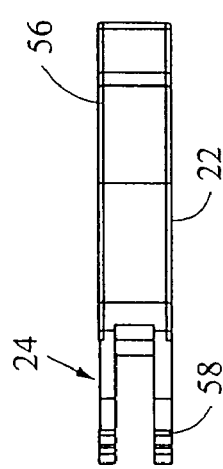
Figure 8D:
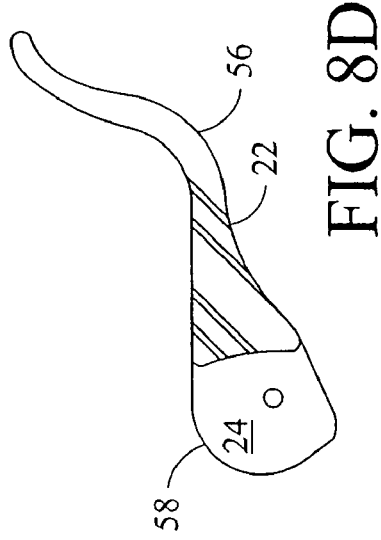
Figure 9A:
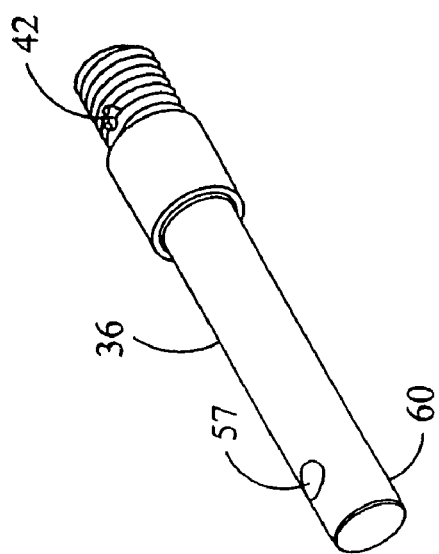
FIGS. 9A–9C are views of the stud shown in FIG. 6.
Figure 9C:
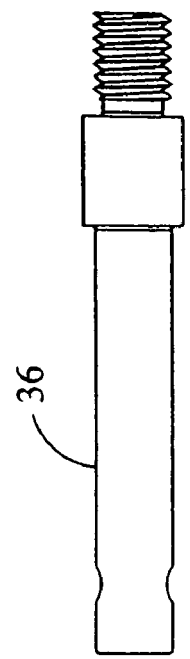
Figure 9B:
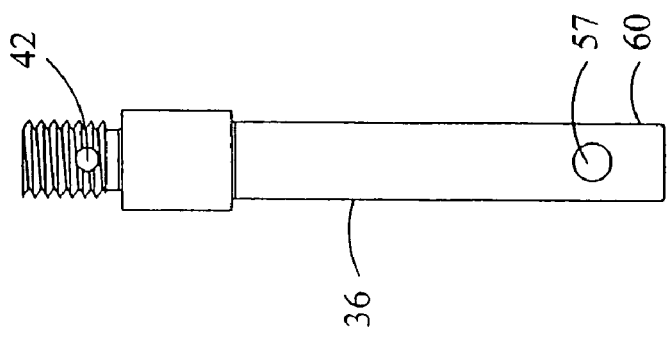
Figure 10A:
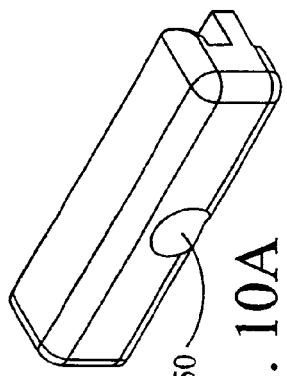
FIGS. 10A–10E are views of the adjustable arm shown in FIG. 6.
Figure 10E:
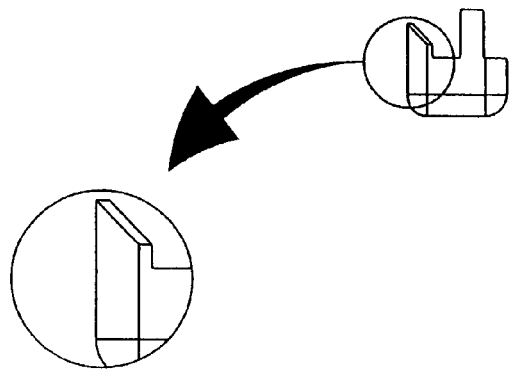
Figure 10B:
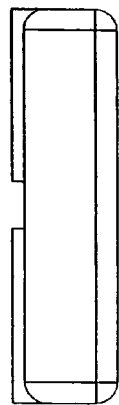
Figure 10C:
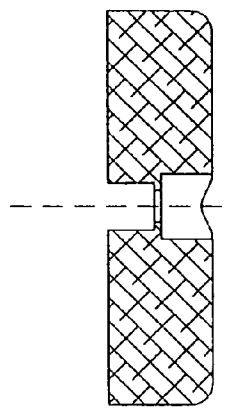
Figure 10D:
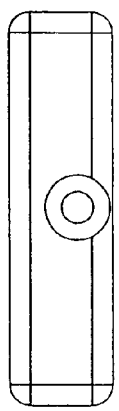

Referring to FIGS. 6 and 7, the clamp 10 may comprise a body 12 constructed of any sufficiently rigid material such as metal, plastic, or composite material. The body 12 preferably defines the side wall 18 of the channel 16 as well as a central opening 32 by which the clamp 10 may be secured to a tripod or other support using a bolt, pin, or other similar protrusion. The opening 32 may be threaded to receive a bolt, or alternately may not be threaded such that interconnection with a tripod or other support may be made using a wing nut or other fastener.

The body 12 may also define a sleeve 34 (shown in FIG. 7) into which the stud 36 may be inserted. The stud 36 and the sleeve 34 are preferably threaded to ensure a rigid connection. If further means are desired to ensure a rigid connection between the stud 36 and the body 12, they may each define aligned holes 40 and 42 through which a fastening pin 44 may be inserted. Alternatively, a thread locking compound may be used. The body preferably also defines two symmetrically opposed sockets 38 into which the springs 28 may be inserted. The sockets 38 and the sleeve 34 may also preferably be parts of a slot 46 defined by the body 12.

The adjustable arm 14 preferably defines the side wall 20 as well as a ledge 48 sized to fit snugly within the slot 46. The springs 28, when inserted into their respective sockets 38 will push on the ledge 46 as the adjustable arm is engaged with the body 12. The adjustable arm 14 may also define a partially bored opening 50 so that the opening 50 may simultaneously retain the locking member 30 within itself while permitting the stud 36 to extend completely through the adjustable arm 14.

The locking member 30 may comprise a plurality of adjacent Belleville washers that together function as a compression spring. Optionally, a thrust washer 54 (shown in FIGS. 6 and 12A–12C) may be located at either or each end of the plurality of Belleville washers.

Referring to FIGS. 8A–8E, the lever 22 may comprise a handle portion 56 and a yoke 58. The yoke 58 may also define the cam portion 24 that, as previously described, operates the locking member 30 as the lever 22 is rotated. The yoke 58 preferably receives the distal end 60 of the stud 36. The stud 36 may be secured to the yoke 58 using a dowel pin 39 that is inserted into aligned openings 57 and 63 formed by the stud 36 and the yoke 58, respectively.

As can be seen by FIG. 6, the clamp 10 may be assembled by first inserting the stud 36 and the springs 28 into the body 12. The adjustable arm 14 may then be pushed against the springs 28 until the adjustable arm 14 is engaged with the body 12 and the stud 36 protrudes through the adjustable arm 14. The locking member 30, which may comprise a series of washers 52 and 54, may be engaged over the stud 36 to fit within the partially bored opening 50 within the adjustable arm 14. The lever 22 may then be secured to the distal end 60 of the stud 36 to secure the assembly in place.

Referring to FIGS. 8A–8E, the cam lever 22 comprises a shape that assists the convenient operation of the clamp 10. Existing clamps employ levers that are exclusively positioned to one of the lateral sides of the clamp. Camera bodies are typically positioned directly over these existing levers, which often makes them difficult to reach when engaging or releasing the clamp. The cam lever 22, however, includes a handle portion 56 that extends from the yoke 58. The handle portion 56 is elongate and has a sufficient length to extend beyond, and curve around, a lateral corner 61 of the clamp 10 when the cam lever is in the second, or locked position as seen in FIG. 4. The cam lever also extends beyond the opposed lateral corner 62 when the cam lever is in the first position as seen in FIG. 1. The cam lever 22 therefore is easily accessible even though a camera body is secured to the clamp.

Frequently, a photographer will wish to take successive shots with the camera at slightly different positions with respect to the subject. Also, and particularly where the camera is to be positioned close to the subject where the focal length is very small, it would be advantageous to secure the camera to the support and then move the camera to an appropriate position. Though the clamp 10 shown in FIGS. 1–3 permits a camera to be quickly secured to a support, the clamp 10 does not facilitate small adjustments of the position of the camera. Instead, the tripod or other support must be moved or the camera detached from the clamp 10 and attached at a new position.

Figure 13A:
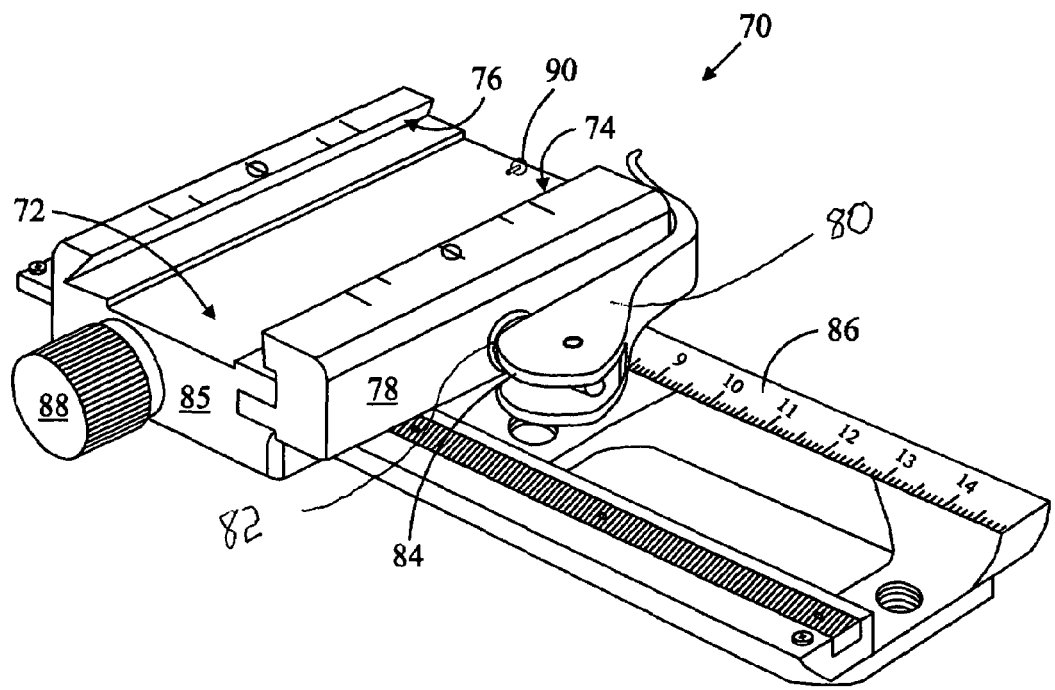
FIG. 13A is a perspective view of an alternate embodiment of the present invention showing a clamp slidably mounted to a rail.

FIG. 13A shows a clamp 70 that permits the adjustment of the position of the camera with respect to a tripod or other support while the camera remains secured to the clamp. Similar to the clamp 10, the clamp 70 may define a channel 72 having laterally opposed first and second side walls 74 and 76, respectively. The first side wall 74 is selectively movable between a first position and a second position with respect to the second side wall 76 through movement of an arm 78. The arm 78 is moved by operation of a lever 80 between an open and closed position. Preferably, a compressible member 82 is positioned between the arm 78 and the lever 80 and the lever 80 includes a cam surface 84 so that both the open and closed positions are detent positions.

The clamp 70 includes a base 85 that defines the second side wall 76. The base 85 is slidably engaged with an elongate rail 86. The base 85 may be selectively moved along the rail 86 by rotation of a knob 88 or otherwise using a non-geared sliding motion. Preferably, a locking member 90 may be used to lock the base 80 into place after it is moved into position. The locking member 90 may be a screw, as shown in FIG. 13A, or alternately may be any other appropriate member such as a pin, clamp, etc. Similarly, though FIG. 13A depicts a knob 88 that is used to move the base 85 along the rail 86, other such mechanisms could be used, such as a crank.

Figure 13B:
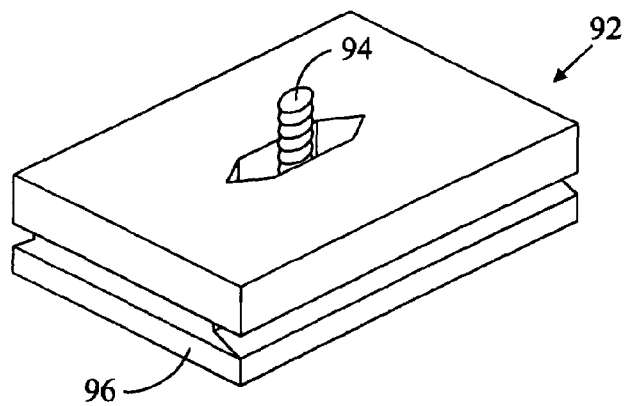
FIG. 13B shows an attachment member securable to the clamp of FIG. 13A and alternately securable to a camera.

A camera may be adjustably secured to a tripod by using the clamp 70 in the following manner. An attachment member 92, such as that depicted in FIG. 13B or any other appropriate device, may be secured to a camera using a bolt 94. The attachment member 92 preferably includes a flanged portion 96 that may be inserted into the channel 72 of the clamp 70 while the arm 78 is in the open position. The camera may then be locked into place by moving the arm 78 to the closed position. Another attachment member, preferably the attachment member 92, may be attached to the bottom of the clamp 70. The flanged portion 96 of this second attachment member may then be inserted into a quick release clamp, such as the quick release clamp 10 or other appropriate clamp, that is secured to the tripod.

A system comprising a quick-release clamp secured to a tripod, a rail-type quick-release clamp such as 70 secured to an attachment member, and a camera secured to an attachment member, is remarkably advantageous. In one configuration, the camera may be attached quickly to the rail-type clamp 70, which in turn may be quickly attached to the tripod. In this configuration the camera may be adjusted to a new position with respect to the photographic subject with a high degree of precision. The system may be switched to a new configuration with the camera directly mounted to the tripod simply by releasing the camera from the clamp 70 then releasing the clamp 70 (with its attachment member) from the clamp 10 on the tripod, and finally inserting the camera into the clamp 10 and securing it in place.

It should be understood that the clamp 10 is used in the description of this system for illustrative purposes, as any clamp will suffice. Similarly, the quick release clamp 70 may preferably be similar to the clamp 10 in operation, i.e., may include a lever 84 with a cam surface 84 and a compressible member 82, though these elements are also not necessary. Preferably, however, the clamping portion of the rail-type clamp will match that attached to the tripod to ensure that the camera may be interchangedly attached to either the tripod or the rail-type clamp.

The terms and expressions that have been employed in the foregoing specification are used therein as terms of description and not of limitation, and there is no intention, in the use of such terms and expressions, of excluding equivalents of the features shown and described or portions thereof, it being recognized that the scope of the invention is defined and limited only the claims that follow.

The invention claimed is:

1. An apparatus for engaging photographic equipment to a support, said apparatus comprising:
   (a) an elongate rail having a front face and a rear face;
   (b) a clamp member slidably engaged with said front face of said rail, said clamp member defining a channel having laterally opposed first and second side walls, said first side wall being selectively movable between a first position and a second position with respect to said second side wall; and
   (c) an attachment connected to said rear face of said rail and matingly engageable with the channel of a second said clamp member.

2. The apparatus of claim 1 where said clamp member includes a lever that causes movement of said first side wall between said first and second positions.

3. The apparatus of claim 2 including a substantially compressible member operably interconnected between said lever and said first side wall.

4. The apparatus of claim 3 where said substantially compressible member is a spring.

5. The apparatus of claim 1 where said clamp member includes a positioner, operation of which selectively slides said clamp member along said rail.

6. The apparatus of claim 5 including a locking member, operation of which alternately restricts or permits the slidable movement of said clamp member along said rail.

7. An apparatus for engaging photographic equipment to a support, said apparatus comprising:
   (a) a member defining a channel having a first side wall capable of lateral movement with respect to a second side wall;
   (b) a lever capable of causing said lateral movement;
   (c) a substantially compressible member operably interconnected between said lever and said first side wall; and
   (d) a rail slidably engaged with said member.

8. The apparatus of claim 7 where said substantially compressible member is a spring.

9. The apparatus if claim 8 where said spring is a series of Belleville washers.

10. The apparatus of claim 7 including a positioner, operation of which selectively slides said member along said rail.

11. The apparatus of claim 10 including a locking member, operation of which alternately restricts or permits the slidable movement of said member along said rail.

12. A method for securing a camera to a tripod where said camera may be selectively moved laterally with respect to said tripod, said method comprising;
   (a) securing a first member to said camera, said first member having an first outwardly flanged portion selectively grippable by an upper clamp defining a channel having a first side wall capable of selective lateral movement between an inner position and an outer position with respect to a second side wall, said upper clamp being slidably mounted to a rail;
   (b) securing said camera and said first member to said upper clamp by inserting said first outwardly flanged portion into said channel while said first side wall is in said outer position, then moving said first side wall to said inner position so that said channel grips said first outwardly flanged portion;
   (c) securing a second member to said rail, said second member having a second outwardly flanged portion selectively grippable by a lower clamp defining a channel having a first side wall capable of selective lateral movement between an inner position and an outer position with respect to a second side wall;
   (d) securing said camera, said first member, said upper clamp, and said second member to said lower clamp by inserting said second outwardly flanged portion into said channel while said first side wall is in said outer position, then moving said first side wall to said inner position so that said channel grips said second outwardly flanged portion; and
   (e) securing said tripod to said lower clamp.

13. The method of claim 12 where said first side wall moves between said inner and outer positions by operation of a lever.

14. The method of claim 13 where said lever is in a detent position when said side wall is in said inner position and said outer position.

15. The method of claim 14 where said lever is a cam lever and a compressible member is positioned between said lever and said first side wall.

16. The method of claim 12 where said upper clamp includes a positioner, operation of which selectively slides said upper clamp along said rail.

17. The method of claim 16 where said first clamp includes a locking member, operation of which alternately restricts or permits the slidable movement of said clamp along said rail.

18. A system comprising:
(a) a first member selectively securable to a tripod, said first member defining a channel having a first side wall capable of lateral movement with respect to a second side wall and an actuator capable of selectively causing said movement;
(b) a second member selectively securable to said first member, said second member having a rail and a channel portion, said channel portion defining a channel having a first side wall capable of lateral movement with respect to a second side wall and an actuator capable of selectively causing said movement; and
(c) an attachment member selectively attachable to a camera and alternately securable to said first member when said second member is not secured to said first member and said second member when said second member is secured to said first member.

19. The system of claim 18 where said second member includes a positioner, operation of which selectively slides said channel portion along said rail.

20. The system of claim 19 where said second member includes a locking member, operation of which alternately restricts or permits the slidable movement of said channel portion along said rail.

* * * * *

UNITED STATES PATENT AND TRADEMARK OFFICE
CERTIFICATE OF CORRECTION

PATENT NO. : 7,077,582 B2
APPLICATION NO. : 10/746775
DATED : July 18, 2006
INVENTOR(S) : Joseph M. Johnson Page 1 of 1

It is certified that error appears in the above-identified patent and that said Letters Patent is hereby corrected as shown below:

Col. 5, Line 2, Change "it" to --its--
Col. 6, Lines 64 and 65, Change "base 80" to --base 85--
Col. 7, Line 37, Change "lever 84" to --lever 80--
Col. 7, Line 49, Change "limited only the claims" to --limited only by the claims--
Col. 8, Line 24, Change "if" to --of--
Col. 8, Line 36, Change "an" to --a--

Signed and Sealed this

Twenty-fifth Day of March, 2008

JON W. DUDAS
*Director of the United States Patent and Trademark Office*